3,175,864
REAR DUMP TRAILER
Don S. Strader, Mount Prospect, Ill., assignor to The Frank G. Hough Co., a corporation of Illinois
Filed May 9, 1963, Ser. No. 279,059
15 Claims. (Cl. 298—20)

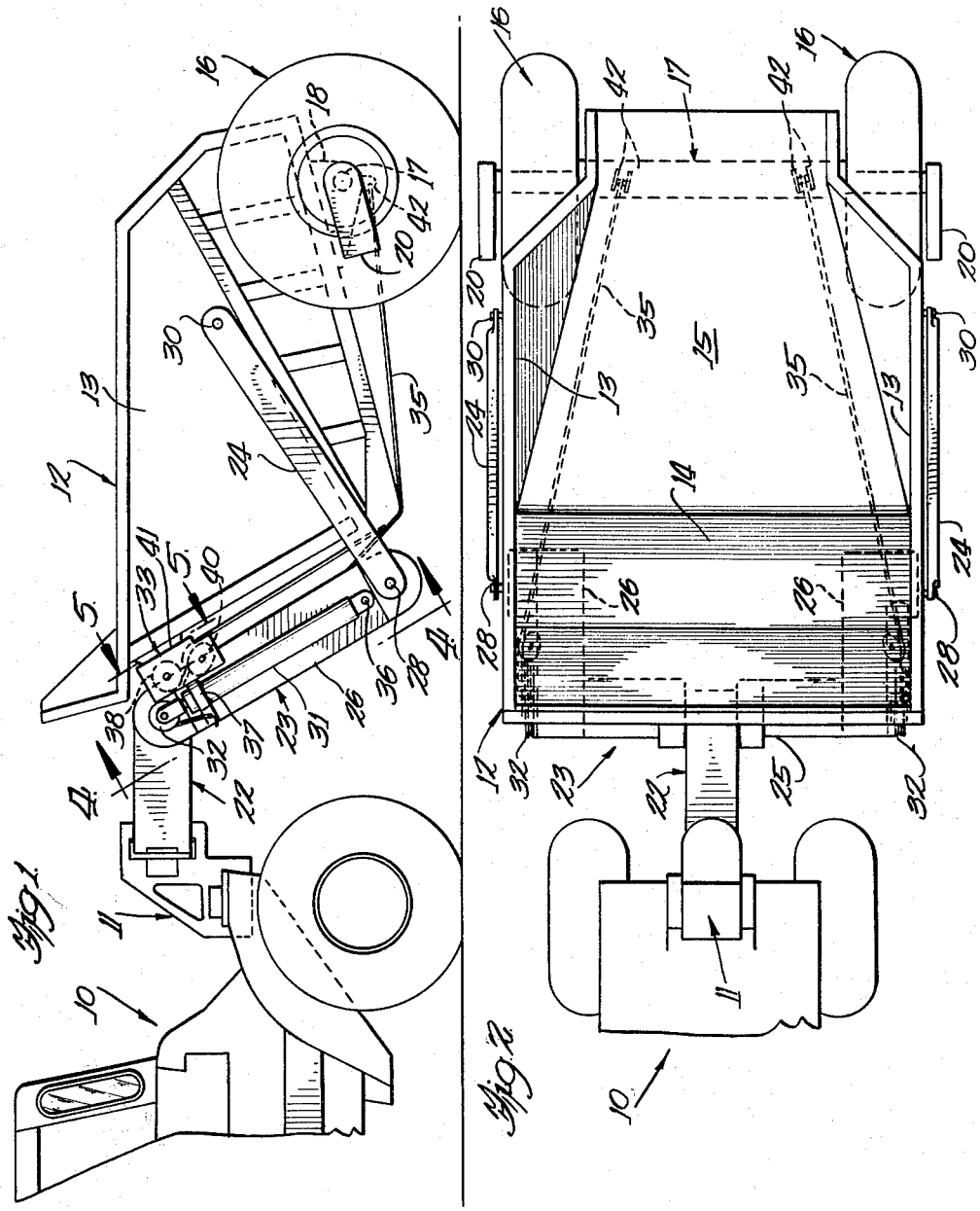

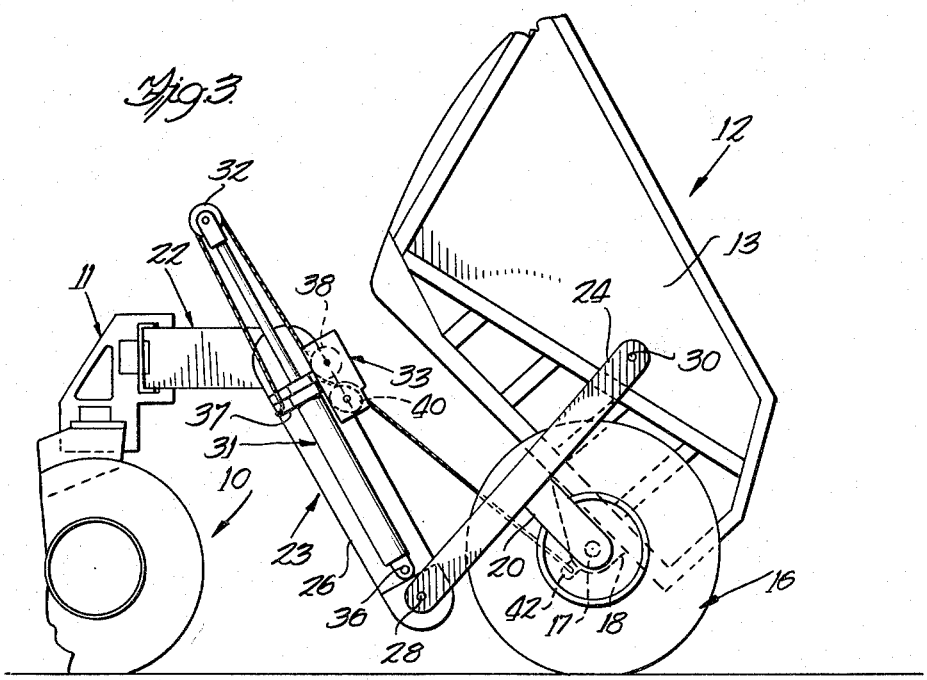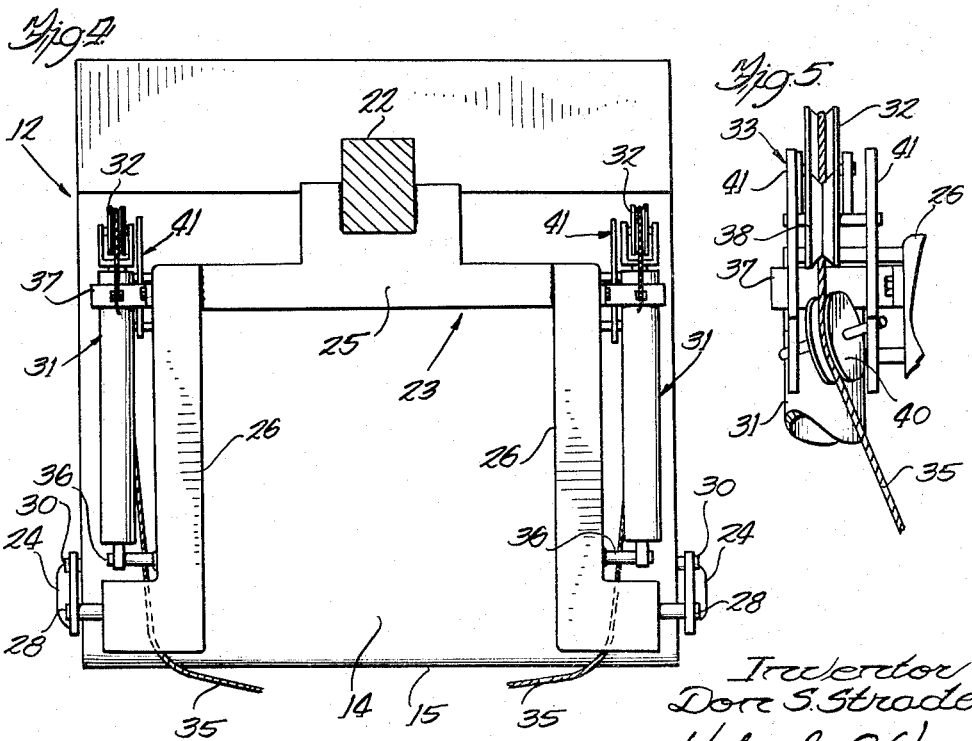

This invention relates generally to rear dump trailers, and more specifically to two-wheeled rear dump trailers in which the wheel and axle assembly is secured to the dump body and the dump body is pivotally connected to a yoke assembly.

The primary object of the present invention is to provide a novel construction for a rear dump trailer of the type having the wheel and axle assembly thereof secured to the body and having the dump body pivotally connected to a yoke assembly.

It is another object to provide a novel dumping means for a rear dump trailer according to the preceding paragraph in which single-stage hydraulic cylinders are used instead of multi-stage hydraulic cylinders.

It is still another object to provide a novel leverage arrangement for a dump trailer according to the preceding paragraphs in which a relatively long effective lever arm is used in the initial dumping movement of the dump body with the effective lever arm being substantially reduced to increase the dumping speed of the dump body when a substantial portion of the load has been dumped from the dump body.

Other objects and features of the invention will be apparent upon a perusal of the following specification and drawings in which:

FIGURE 1 is a side elevational view of a rear dump trailer constructed according to the invention;

FIGURE 2 is a top plan view of the structure shown in FIGURE 1;

FIGURE 3 is a side elevational view similar to FIGURE 1 but showing the dump trailer operated to the dump position;

FIGURE 4 is an elevational view of a portion of the dump mechanism and taken substantially along the line 4—4 of FIGURE 1; and FIGURE 5 is an enlarged elevational view of a portion of the dump mechanism and taken substantially along the line 5—5 of FIGURE 1.

The present embodiment is the preferred embodiment, but it is to be understood that changes can be made in the present embodiment by one skilled in the art without departing from the spirit and scope of the present invention.

Generally, the rear dump trailer of the subject invention comprises a rear dump body which at its rearward end is carried on a pair of wheels. A rigid axle is fixedly secured to the underside and at the rearward end of the dump body. The wheels are rotatively carried on the outer ends of the axle. Outwardly of the wheels, the axle is provided with limit stops which extend forwardly of the axis of rotation of the wheels. The dump body in turn is carried on an arrangement of a gooseneck, a draft yoke, and a pair of draft links. The gooseneck is supported at one end thereof on a bolster which in turn is carried on a suitable tractor. The other end of the gooseneck is secured to the cross member of the draft yoke. The draft arms of the draft yoke extend downwardly and rearwardly of the cross member. One end of each draft link is pivotally connected to the lower end of one of the draft arms. The other end of each draft link is pivotally connected to the dump body on one side thereof at a position forwardly and above the axis of rotation of the wheels of the trailer. The lower rearward portion of the dump body is recessed to provide clearance for the wheels, and this arrangement permits the draft links to engage the limit stops on the outer ends of the axle assembly when the dump body has been raised to the dump position. This cooperation between the draft links and the limit stops is shown in FIGURE 3. In the lowered position of the dump body, the forward end of the dump body engages the draft yoke to be supported thereby.

The means for dumping the dump body comprises a pair of single-stage hydraulic cylinders, two sets of pulley arrangements, and a pair of cables. Each of the hydraulic cylinders is mounted on the outboard side of one of the draft arms with the head end of each cylinder being pivotally carried on the lower end of one of the draft arms. Each cylinder extends parallel to the longitudinal axis of the draft arms and the rod end of each cylinder carries a pulley. A pair of pulleys is fixedly carried on each of the draft arms at the upper end thereof and adjacent the rearward edge thereof. Each of the cables is anchored to one of the draft arms at the upper end thereof and adjacent the forward edge thereof. Each cable then extends over the upper side of the pulley of one of the hydraulic cylinders and thence downwardly and between the pulleys of the associated pair of fixedly carried pulleys. The lower pulley of each pair of pulleys is slightly tilted from the vertical to permit the cable to be angled slightly inwardly of the dump body. Each cable is then reeved downwardly and inwardly to the forward lower end of the dump body, at which position a curved surface is provided of a radius sufficiently large to prevent a sharp bending of the cable. Each cable then extends about the underside of the lower forward end of the dump body and substantially rearwardly to a connection with the axle housing of the trailer inwardly of the wheels. From the foregoing it may be seen that if the hydraulic cylinders are extended the cables will be drawn upwardly and forwardly by the pulleys on the rod ends of the hydraulic cylinders. Since the cables extend downwardly on each side of the pulleys of the hydraulic cylinders, it may be seen that for every unit of stroke of the hydraulic cylinders, the length of the cable from the axle to the pairs of pulleys carried on the draft arms is effectively shortened by twice the length of that unit stroke. With this arrangement it has been found that the hydraulic cylinders need not be multi-stage cylinders but that single-stage cylinders are entirely adequate. This novel feature is a result not only of the shortening action on the cables as the hydraulic cylinders are extended, but also results from the unique carrying arrangement of the cylinders longitudinally of the draft arms, which arrangement permits the use of relatively long single-stage hydraulic cylinders. It may be appreciated from the drawings that the forward bottom wall and the rearward bottom wall of the trailer are roughly equal in length and are joined at the lower forward end of the dump body to define the load carrying dump body, and because the draft arms extend substantially the length of the forward bottom wall of the body, the draft arms are relatively long and consequently the hydraulic cylinders are relatively long.

From the drawings it may be seen that during the initial lifting of the forward end of the dump body, the force applied to the lower forward end of the dump body through the lifting action of the cables is such that the lifting force is applied through an effective lever arm which has a length which is roughly equal to the distance between the axis of the axle assembly and the lower forward end of the dump body. Once the lower forward end of the body leaves the cables, the effective lever arm through which the dump body is further dumped to a position such as shown in FIGURE 3 is of a length which is roughly equal to the distance between the axis of the axle assembly and the axis of rotation of the draft links to the dump body.

It may be easily ascertained from the drawings that the first effective lever arm for the initial raising of the dump body is considerably longer than the second effective lever arm for dumping of the dump body after the lower forward end of the dump body has left the cable. This arrangement provides the feature that when the load is relatively heavy, the greatest lifting force is applied thereto and when the load has become relatively light, the further lifting and dumping force has been substantially reduced with a consequent increase in dumping speed.

When the hydraulic cylinders are substantially fully extended, the draft links will engage the limit stops carried on the axle assembly to limit the movement of the body to a definite position for complete dumping and to prevent the body movement from going beyond the desirable extension of the hydraulic cylinders.

It is apparent from the foregoing general description that the various desirable features of the invention are produced by the unique combination of the various parts of the dump trailer to produce a relatively simple, efficient and improved dump trailer over constructions previosly known in the art.

In detail, a portion of a tractor for hauling and operating the dump trailer of the subject invention is indicated generally in the drawings at 10. The tractor 10 may of any suitable type known in the art and is provided with a bolster 11 of any suitable known construction. The bolster 11 provides a pivotal connection between the dump trailer and the tractor which permits the dump trailer to be pivoted relative to the tractor about a vertical axis positioned through the rearward end of the bolster 11 and about a horizontal axis positioned through the lower portion of the bolster 11.

The dump body of the trailer is indicated generally at 12 and comprises a pair of side walls 13 secured to a forward bottom wall 14 and a rearward bottom wall 15. The forward bottom wall 14 and the rearward bottom wall 15 are joined to provide a curved surface for the lower forward end of the dump body 12. When the upper side of the side walls 13 is disposed substantially horizontally, the forward bottom wall 14 is disposed at an angle of approximately 60 degrees to the horizontal and the rearward bottom wall is disposed at an angle of approximately 15 degrees to the horizontal. The lower rearward portions of the side walls 13 are angled inwardly of the dump body 12 to define recesses in which the wheels 16 of the dump trailer may be rotatively carried. The various walls of the dump body may be reinforced with suitable ribs and flanges to provide any desired rigidity of the dump body 12.

The wheels 16 are rotatively carried on a fixed axle shaft of an axle assembly 17 with the axle shaft extending through the bearings of the wheels 16 and outwardly thereof. The axle assembly 17 is secured to the underside of the bottom wall 15 of the dump body 12 substantially at the rearward end thereof by brackets 18. A member 20 which is provided as a limit stop for the dumping of the body 12 is rigidly secured to each outer end of the axle shaft of the axle assembly 17.

The forward end of the dump body 12 is supported on an assembly of a gooseneck 22, a draft yoke 23, and a pair of draft links 24. The forward end of the gooseneck 22 is pivotally connected to the bolster 11 for pivotal movement about a vertical axis through the rearward end of the bolster 11. The rearward end of the gooseneck 22 is rigidly secured to the draft yoke 23. The draft yoke 23 comprises a cross member 25 and a pair of draft arms 26. The cross member 25 at the longitudinal center thereof is secured to the rearward end of the gooseneck 22. One end of each of the draft arms 26 is secured to one end of the cross member 25 to extend perpendicularly therefrom and downwardly and rearwardly of the tractor 10. Each draft arm 26 is of a length approximately equal to the length of the forward bottom wall 14 of the dump body 12. One end of each of the draft links 24 is pivotally connected to the lower end of one of the draft arms 26 by a pin assembly 28. The other end of each draft link 24 is pivotally connected to one of the side walls 13 of the dump body 12 by a pin assembly 30. The pin assemblies 30 are carried on the side walls 13 of the dump body 12 at positions forwardly and above the axis of the axle assembly 17. This arrangement provides that in the horizontal load receiving position of the dump body 12, the forward bottom wall 14 of the dump body will engage the upper rearward side of the draft yoke 23 to be supported thereby with the lower forward end of the dump body 12 spaced above the ground substantially the same distance as the lower end of the draft arms 26 of the draft yoke 23.

The means for raising the forward end of the dump body 12 to dump any load therefrom comprises a pair of duplicate lift assembiles. The invention contemplates that one rather than two lift assemblies may also be used. The dump trailer of the present embodiment requires no power means for returning the dump body 12 from the dump position to the loading position because the center of gravity of the dump body 12 is always disposed forwardly of the axis of the axle assembly 17. Since the lift assemblies are formed in duplicate, only one need be described in detail. Each lift assembly comprises a single-stage hydraulic cylinder 31, a moving pulley 32, a fixed pulley assembly 33, and a cable 35. The head end of the hydraulic cylinder 31 is pivotally connected by a pin assembly 36 to the lower outboard side of the draft arm 26 closely adjacent to the pin assembly 28 for the draft link 24. The hydraulic cylinder 31 extends substantially the length of the draft arm 26 to the upper end thereof, and the upper end of the cylinder is secured to the draft arm 26 by a suitable collar 37. The moving pulley 32 is rotatively carried on the upwardly extending end of the piston rod of the hydraulic cylinder 31. The fixed pulley assembly 33 comprises a pair of pulleys 38 and 40 which are rotatively carried between a pair of plates 41 as may easily be seen in FIGURE 5. The pair of plates 41 are secured in a parallel spaced apart relationship to each other to the upper rearward side of the draft arm 26 adjacent the upper end of the hydraulic cylinder 31. The pulley 38 is positioned to rotate in the same plane as the pulley 32, and that plane is disposed parallel to the longitudinal axis of the dump trailer. The axis of rotation of the pulley 40 is tilted to receive a cable from the lower forward side of the pulley 38 and to lead that cable downwardly and inwardly of the sides of the dump body 12.

One end of the cable 35 is anchored to the collar 37 on the forward side thereof. The cable extends from its anchoring point over the upper side of the pulley 32 and then downwardly and between the two pulleys 38 and 40. From the lower rearward side of the pulley 40, the cable 35 extends downwardly and about the curved corner of the lower forward end of the dump body 12. From the lower forward end of the dump body 12, the cable extends inwardly and rearwardly to a cable anchoring bracket 42 which is secured to the underside of the axle assembly 17 immediately inwardly of the wheel 16.

From the foregoing it may be seen that when the hydraulic cylinder 31 is extended, the cable 35 will be drawn upwardly from the fixed pulley assembly 33, and this will result in the application of a lifting force on the lower forward end of the dump body 12. It may further be seen that the effective lever arm of the applied lifting force is roughly equal in length to the distance between the axis of the axle assembly 17 and lower forward end of the dump body 12. After the dump body 12 has been partially raised toward the dump position, the lower forward end of the dump body 12 will rise off of the cable 35 and the cable 35 will then extend directly from the fixed pulley assembly 33 to the cable anchoring bracket 42 on the axle assembly 17. It may be seen that the effective lever arm is then reduced in length to substantially approximate the distance between the axis of the axle assembly 17 and the axis of the pin assembly 30. Because of the relatively shorter effective lever arm, the speed of dumping will be increased during the latter portion of the dumping operation. The full dump position of the dump body 12 will be achieved when the limit stops 20 engage the draft links 24 intermediate the ends thereof such as shown in FIGURE 3.

The dump body 12 is returned from the dump position to the load receiving position by a retraction of the hydraulic cylinder 31, and as the dump body 12 is lowered, the lower forward end thereof will again engage the cables 35.

Having described the invention, what is considered new and desired to be protected by Letters Patent is:

1. In a rear dump trailer, a dump body adapted to dump a load from the rearward end thereof, an axle assembly carried on the bottom wall of said dump body at the rearward end thereof, a pair of wheels, said wheels rotatively carried on each end of said axle assembly, a draft yoke comprising a cross member and a pair of draft arms carried to extend perpendicularly from each end of said cross member, a pair of draft links, each of said draft links pivotally connected between the extending end of one of said draft arms and one side of said dump body, the pivotal connections of said draft links to said dump body being spaced forwardly and above the axis of said axle assembly, a hydraulic cylinder secured to one of said draft arms to extend longitudinally thereof with the rod end of said hydraulic cylinder positioned at the end of said draft arm connected to said cross member, a pulley carried on the piston rod of said hydraulic cylinder, a cable connected at one end thereof to the underside of said dump body near the axis of said axle assembly and extending therefrom along the bottom wall of said dump body, around the lower forward end of said dump body, upwardly and over the pulley carried on said piston rod to a connection on said draft yoke, said hydraulic cylinder operating on the extension thereof to draw said cable upwardly from the lower forward end of said dump body to raise the forward end of said dump body about the axis of said axle assembly to dump any load therefrom.

2. In a rear dump trailer as defined in claim 1, in which said draft arms and said hydraulic cylinder have lengths substantially equal to the length of the forward wall of said dump body, and wherein said hydraulic cylinder is a single-stage hydraulic cylinder.

3. In a rear dump trailer as defined in claim 1, wherein the axis of the pivotal connection of said draft links to said dump body is so positioned that when said dump body is moved to a substantially full dump position the lower forward end of said dump body is positioned above and spaced from said cable.

4. In a rear dump trailer, a dump body adapted for dumping from the rearward end thereof, an axle assembly carried on the rearward end of the bottom wall of said dump body, a pair of wheels, said wheels rotatively carried on each end of said axle assembly, a draft yoke comprising a pair of draft arms, said draft yoke adapted to be supported from a vehicle with said draft arms extending downwardly, a pair of draft links, each of said draft links pivotally connected between the lower end of one of said draft arms and one side of said dump body, the pivotal connections of said draft links to said dump body being spaced forwardly and above the axis of said axle assembly, a pulley assembly carried on the upper rearward side of one of said draft arms, a cable connected at one end thereof to the underside of said dump body near the axis of said axle assembly and extending therefrom along the bottom wall of said dump body and upwardly through said pulley assembly to a connection on the upper forward side of said one draft arm, and hydraulic cylinder means carried on said one draft arm and engaging said cable between said pulley assembly and the connection of said cable to said one draft arm, said hydraulic cylinder means operable to draw said cable upwardly from said pulley assembly to raise the forward end of said dump body about the axis of said axle assembly until said lower forward end of said dump body rises above said cable and to thereafter draw the rearward end of said dump body toward said draft yoke so that said draft links further raise said dump body.

5. In a rear dump trailer as defined in claim 4, wherein the distance between the axis of said axle assembly and the axis of the pivotal connections of said draft links to said dump body is substantially less than the distance between the axis of said axle assembly and the lower forward end of said dump body.

6. In a rear dump trailer, a dump body adapted for dumping from the rearward end thereof and having forward and bottom walls joined in a corner, an axle assembly carried on the rearward end of the bottom wall of said dump body, a pair of wheels, said wheels rotatively carried on each end of said axle assembly, a draft yoke comprising a pair of draft arms, a pair of draft links, each of said draft links pivotally connected between the lower end of one of said draft arms and one side of said dump body, the pivotal connections of said draft links to said dump body being spaced forwardly and above the axis of said axle assembly so that the upper forward end of said dump body engages the upper rearward side of said draft yoke in the load receiving position of said dump body, a cable connected between the upper end of said draft yoke and the underside of said dump body near the axis of said axle assembly with said cable bent about the junction of said forward and bottom walls of said dump body, and hydraulic cylinder means for drawing said cable upwardly from the lower forward end of said dump body to raise the forward end of said dump body about the axis of said axle assembly until said junction of said forward and bottom walls rises above said cable whereby the further drawing of said cable upwardly moves the rearward end of said dump body toward said draft yoke with said draft links further raising said dump body to the full dump position.

7. In a rear dump trailer, a dump body adapted for dumping from the rearward end thereof and having forward and bottom walls joined in a corner, an axle assembly carried on the rearward end of the bottom wall of said dump body, a pair of wheels, said wheels rotatively carried on each end of said axle assembly, a draft yoke comprising a cross member adapted to be supported from a vehicle and a pair of draft arms secured at each end of said cross member and extending downwardly therefrom, a pair of draft links, each of said draft links pivotally connected between the lower end of one of said draft arms and one side of said dump body, the pivotal connections of said draft links to said dump body being spaced forwardly and above the axis of said axle assembly so that the upper forward end of said dump body engages the upper rearward side of said draft yoke in the load receiving position of said dump body, a pulley assembly carried on the upper rearward side of one of said draft arms, a cable connected at one end thereof to the underside of said dump body near the axis of said axle assembly and extending therefrom in a forward direction about the junction of said forward and bottom walls of said dump body and upwardly through said pulley assembly to a connection on the upper forward side of said one draft arm, and hydraulic cylinder means carried on said one draft arm with the rod end of said hydraulic cylinder means disposed upwardly and positioned between said pulley assembly and the connection of said cable to said one draft arm, a pulley rotatively carried on the extending end of the piston rod of said hydraulic cylinder means with the portion of said cable between said pulley assembly and the connection of said cable to said one draft arm being reeved over the upper side of said pulley.

8. In a rear dump trailer as defined in claim 7, wherein the length of said one draft arm is substantially equal to the height of the forward wall of said dump body, and wherein said hydraulic cylinder means comprises a single-stage hydraulic cylinder which in the fully retracted position thereof extends substantially from the lower end of said one draft arm to the upper end thereof.

9. In a rear dump trailer as defined in claim 8, wherein the distance between the axis of said axle assembly and the axis of the pivotal connections of said draft links to said dump body is substantially less than the distance between the axis of said axle assembly and the junction of said forward and bottom walls of said dump body.

10. In a rear dump trailer as defined in claim 9, a pair of limit stop members, said limit stop members being secured to the outer end of said axle assembly outwardly of said wheels, and the lower rearward portion of said dump body being recessed so that each of said limit stop members is positioned in a plane including one of said draft links and parallel to the longitudinal axis of said dump trailer, whereby said limit stop members engage said draft links intermediate the ends thereof when said dump body is positioned substantially in the full dump position.

11. In a rear dump trailer as defined in claim 7, wherein said pulley assembly comprises a pair of pulleys rotatively carried in a vertically spaced apart relationship on the upper rearward side of said one draft arm, and said cable being reeved over the upper rearward side of the lower of said two pulleys and over the lower forward side of the upper of said two pulleys.

12. In a rear dump trailer, a dump body comprising an upwardly and forwardly sloping front bottom wall and a rear bottom wall, an axle assembly carried on the rearward end of said rear bottom wall, a pair of wheels, said wheels rotatively carried on each end of said axle assembly, a draft yoke comprising a pair of draft arms, said draft yoke adapted to be supported from a vehicle with said draft arms sloping downwardly and rearwardly, a pair of draft links, each of said draft links pivotally connected between the lower end of one of said draft arms and one side of said dump body, the pivotal connections of said draft links to said dump body being spaced forwardly and above the axis of said axle assembly, the length of said draft links being such that said front bottom wall of said dump body substantially parallelly engages the rearward side of said draft arms, a cable connected between said draft yoke and the underside of said dump body near the axis of said axle assembly, said cable being positioned intermediate the connections thereof to engage the lower end of said forward bottom wall of said dump body, and hydraulic cylinder means for drawing said cable upwardly from the forward bottom wall of said dump body to raise the forward end of said dump body to dump any load therefrom.

13. In a rear dump trailer, a dump body comprising an upwardly and forwardly sloping front bottom wall, a rear bottom wall joined to the lower end of said front bottom wall, and a pair of side walls joined to the side marginal edges of said front bottom wall and said rear bottom wall, the lower rearward portion of said side walls being recessed to permit wheels to be carried therewithin, an axle assembly carried on the rearward end of said rear bottom wall, a pair of wheels, said wheels rotatively carried on each end of said axle assembly and within said recessed portion of said side walls, a limit stop member carried on each outer end of said axle assembly outwardly of said wheels and immediately outwardly of each of said side walls, a draft yoke comprising a pair of draft arms, a pair of draft links, each of said draft links pivotally connected between the lower end of one of said draft arms and the outward side of one of said side walls of said dump body, the pivotal connections of said draft links to said dump body being spaced on said side walls forwardly and above the axis of said axle assembly and so that said limit stop members engage said draft links intermediate the end thereof when the forward end of said dump body is raised to move said dump body to the dump position thereof, a cable connected between said draft yoke and the underside of said dump body near the axis of said axle assembly, said cable being positioned intermediate the connections thereof to engage the lower end of said forward bottom wall of said dump body, and hydraulic cylinder means for drawing said cable upwardly from the forward bottom wall of said dump body to raise the forward end of said dump body to dump any load therefrom.

14. In a rear dump trailer, a dump body comprising an upwardly and forwardly sloping front bottom wall and a rear bottom wall, an axle assembly carried on the rearward end of said rear bottom wall, a pair of wheels, said wheels rotatively carried on each end of said axle assembly, a draft yoke comprising a pair of draft arms, a pair of draft links, each of said draft links pivotally connected between the lower end of one of said draft arms and one side of said dump body, the pivotal connections of said draft links to said dump body being spaced forwardly and above the axis of said axle assembly, a cable connected between said draft yoke and the underside of said dump body near the axis of said axle assembly, a pulley assembly fixedly carried on said draft yoke with said cable reeved therethrough, said cable being carried from said pulley assembly so that said cable extends along said forward bottom wall and said rear bottom wall with said cable engaging the lower end of said forward bottom wall in the load receiving position of said dump body and so that said lower end of said forward bottom wall is positioned above and spaced from said cable when said dump body is in the dump position thereof, and hydraulic cylinder means engaging said cable between the connection of said cable to said draft yoke and said pulley assembly for drawing said cable upwardly from said pulley assembly to raise the forward end of said dump body to said dump position.

15. In a rear dump trailer adapted to be hauled by an associated tractor, a dump body having load-carrying and rear dump positions, an axle assembly carried adjacent the lower rearward end of said dump body, a pair of wheels rotatively carried on said axle assembly, a draft yoke adapted to be connected with the tractor, said draft yoke including a pair of rearwardly extending draft arms supportably engaging said dump body when in its load-carrying position, a pair of draft links pivotally connected between respective draft arms and said dump body, the pivotal connections of said draft links to said dump body being spaced forwardly and above the axis of said axle assembly, a cable connected between said draft yoke and said dump body near the axis of said axle assembly, said cable being positioned intermediate its connections to engage the lower forward end of said dump body, and hydraulic means for drawing said cable upwardly from the lower forward end of said dump body to disengage said dump body from said draft arms and to raise the forward end of said dump body about the axis of said axle assembly to its rear dump position.

References Cited by the Examiner
UNITED STATES PATENTS

| | | | |
|---|---|---|---|
| 2,720,418 | 10/55 | LeTourneau | 298—19 |
| 2,988,399 | 6/61 | Wood | 298—22 |
| 3,011,827 | 12/61 | Keller | 298—20 |

MILTON BUCHLER, *Primary Examiner.*
RALPH D. BLAKESLEE, *Examiner.*